(12) United States Patent
Mishima et al.

(10) Patent No.: US 12,106,770 B2
(45) Date of Patent: Oct. 1, 2024

(54) SOUND MODEL GENERATION DEVICE, SOUND MODEL GENERATION METHOD, AND RECORDING MEDIUM

(71) Applicant: NEC Corporation, Tokyo (JP)

(72) Inventors: Sakiko Mishima, Tokyo (JP); Yu Kiyokawa, Tokyo (JP); Takahiro Toizumi, Tokyo (JP); Kazutoshi Sagi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 338 days.

(21) Appl. No.: 17/623,316

(22) PCT Filed: Jul. 4, 2019

(86) PCT No.: PCT/JP2019/026659
§ 371 (c)(1),
(2) Date: Dec. 28, 2021

(87) PCT Pub. No.: WO2021/001998
PCT Pub. Date: Jan. 7, 2021

(65) Prior Publication Data
US 2022/0358953 A1    Nov. 10, 2022

(51) Int. Cl.
*G06F 15/00* (2006.01)
*G10L 15/06* (2013.01)
*G10L 25/78* (2013.01)

(52) U.S. Cl.
CPC ............ *G10L 25/78* (2013.01); *G10L 15/063* (2013.01)

(58) Field of Classification Search
None
See application file for complete search history.

(56) References Cited

U.S. PATENT DOCUMENTS

| | | | |
|---|---|---|---|
| 9,691,389 B2* | 6/2017 | Chien | G10L 15/28 |
| 10,580,414 B2* | 3/2020 | Zhang | G10L 25/78 |
| 10,672,387 B2* | 6/2020 | Lyon | G10L 19/26 |
| 11,222,640 B2* | 1/2022 | Zhang | G01N 21/8983 |
| 2011/0036231 A1 | 2/2011 | Nakadai et al. | |
| 2013/0070928 A1* | 3/2013 | Ellis | H04R 25/30 |
| | | | 381/56 |
| 2019/0120719 A1 | 4/2019 | Koizumi et al. | |

(Continued)

FOREIGN PATENT DOCUMENTS

| | | |
|---|---|---|
| JP | H06-274197 A | 9/1994 |
| JP | 2006-017936 A | 1/2006 |

(Continued)

OTHER PUBLICATIONS

International Search Report for PCT Application No. PCT/JP2019/026659, mailed on Aug. 20, 2019.

(Continued)

*Primary Examiner* — Satwant K Singh (57) ABSTRACT

Provided are a sound model generation device and the like that make it possible to more easily generate a sound model capable of distinguishing sound events using a plurality of features. A concatenating unit concatenates a plurality of features of sound signals that are learning data and generates a concatenated feature. A learning unit learns the generated concatenated feature for generating a sound model for distinguishing a sound event from a sound signal.

9 Claims, 9 Drawing Sheets

(56) References Cited

U.S. PATENT DOCUMENTS

2020/0174149 A1* 6/2020 Thiruvenkatanathan ............... E21B 47/107
2022/0216881 A1* 7/2022 Jeong .................. G06N 20/20

FOREIGN PATENT DOCUMENTS

| JP | 2008-224911 A | 9/2008 |
| JP | 2011-039511 A | 2/2011 |
| JP | 2015-040963 A | 3/2015 |
| JP | 2018-081169 A | 5/2018 |
| WO | 2017/171051 A1 | 10/2017 |

OTHER PUBLICATIONS

English translation of Written opinion for PCT Application No. PCT/JP2019/026659, mailed on Aug. 20, 2019.

* cited by examiner

SOUND MODEL GENERATION DEVICE, SOUND MODEL GENERATION METHOD, AND RECORDING MEDIUM

This application is a National Stage Entry of PCT/JP2019/026659 filed on Jul. 4, 2019, the contents of all of which are incorporated herein by reference, in their entirety.

TECHNICAL FIELD

The present invention relates to a sound model generation device, a sound model generation method, and a recording medium, and more particularly, to a sound model generation device and a sound model generation method that generate a sound model for distinguishing a sound event related to voice or audio, and a recording medium.

BACKGROUND ART

There is a related technique of distinguishing a sound event from a sound signal using a sound model learned (trained) using the sound signal (voice signal or audio signal) that is training data. The sound event is an event that occurs as a sound signal or an event that occurs with a sound signal, and is, for example, an abnormal sound associated with occurrence of an abnormality in a machine, a sudden sound (also referred to as an impulse sound) associated with destruction of a structure or a natural phenomenon, a human or animal voice (loud voice, shout, cry, and scream), or the like.

For example, the apparatus described in PTL 1 collects, with a microphone, normal sound and anomalous sound emitted from a professional-use apparatus, and extracts a feature from the spectrum of a recorded sound signal. The apparatus described in PTL 1 generates an anomalous sound model capable of distinguishing a sound event of an anomalous sound by using the extracted feature as training data, detects an anomaly of the apparatus by using the generated anomalous sound model, and outputs an alert.

PTL 2 describes inputting a feature of a phoneme to a neural network, and causing the neural network to learn in such a way that a feature vector representing the phoneme can be distinguished.

CITATION LIST

Patent Literature

[PTL 1] WO 2017/171051
[PTL 2] JP H06-274197 A

SUMMARY OF INVENTION

Technical Problem

In the related techniques described in PTLs 1 and 2, since the human determines the feature of a sound signal suitable for learning of a sound model, learning of the sound model requires skill and knowledge of the human.

The present invention has been made in view of the above problem, and an object of the present invention is to provide a sound model generation device and the like that can more easily generate a sound model capable of distinguishing a sound event using a plurality of features.

Solution to Problem

A sound model generation device according to an aspect of the present invention includes a concatenating for generating a concatenated feature by concatenating a plurality of features of a sound signal that is training data, and a learning means for learning the concatenated feature for generating a sound model for distinguishing a sound event from the sound signal.

A sound model generation method according to an aspect of the present invention includes generating a concatenated feature by concatenating a plurality of features of a sound signal that is training data, and learning the concatenated feature for generating a sound model for distinguishing a sound event from the sound signal.

A recording medium according to an aspect of the present invention stores a program for causing a computer to execute generating a concatenated feature by concatenating a plurality of features of a sound signal that is training data, and learning the concatenated feature for generating a sound model for distinguishing a sound event from the sound signal.

Advantageous Effects of Invention

According to the present invention, it is possible to more easily generate a sound model capable of distinguishing a sound event by using a plurality of features.

EXAMPLE EMBODIMENT

First Example Embodiment

Figure 1:
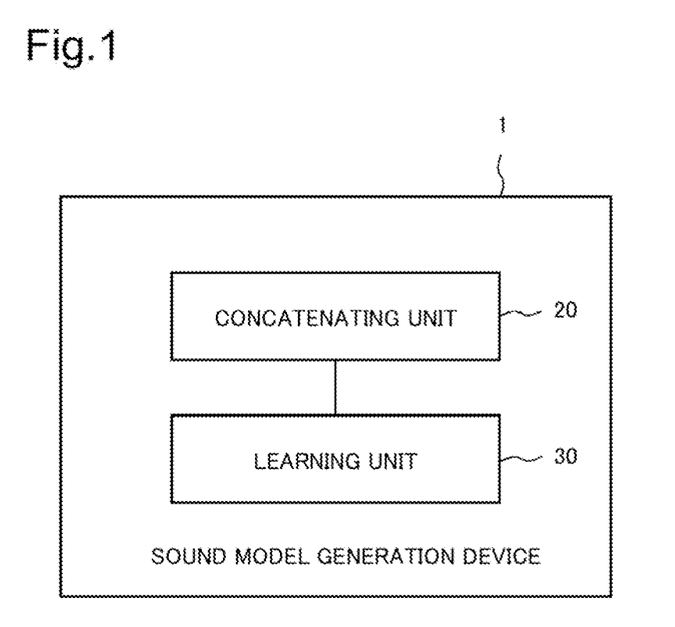
FIG. 1 is a block diagram illustrating a configuration of a sound model generation device according to a first example embodiment.

The first example embodiment will be described with reference to FIGS. 1 and 2.
(Sound Model Generation Device 1)
The configuration of a sound model generation device 1 according to the present first example embodiment will be described with reference to FIG. 1. FIG. 1 is a block diagram illustrating the configuration of the sound model generation device 1. As illustrated in FIG. 1, the sound model generation device 1 includes a concatenating unit 20 and a learning unit 30.

The concatenating unit 20 generates a concatenated feature by concatenating a plurality of features of a sound signal that is training data. The concatenating unit 20 is an example of a concatenating means. Specifically, the concatenating unit 20 acquires information indicating a plurality of features of a sound signal that is training data from a feature database not illustrated, for example. The concatenating unit 20 generates one concatenated feature by concatenating the plurality of acquired features.

The sound signal is a waveform obtained by collecting sound with a microphone. The sound signal is expressed as an amplitude value at a certain time t. Some sound signals have a plurality of amplitude values, i.e., a plurality of audio channels at the certain time t, such as a stereo audio signal. The present example embodiment is also applicable to a sound signal including a plurality of audio channels (hereinafter, sometimes simply referred to as channels).

The sound event is a sound signal associated to a phenomenon (event) in the real world. The sound event sometimes exists as a single sound signal or sometimes exists time piecewise or continuously in a mixture with another sound signal in the sound signal.

The feature vector at the time t is a vector obtained by specific conversion for the sound signal in the time section including the time t. For example, the feature vector is a mean amplitude, power, a power spectrum, a logarithmic spectrum, a mel spectrum, a CQT spectrum, a line spectral pair (LSP) spectrum, a phase spectrum, an autocorrelation coefficient sequence, a mel-frequency cepstrum coefficients (MFCC) coefficient sequence, a group delay coefficient sequence, or the like. When the feature vector is power, the number of dimensions of the feature vector is 1. When the feature vector is a spectrum, the number of dimensions of the feature vector matches the total number of bins of the spectrum. The bin number of each feature vector when the feature vector is a power spectrum is relevant to the frequency. When the feature vector is a mel spectrum, the mel scale is associated to the bin number. The mel scale is a scale of a frequency axis in consideration of human high pitch sound perception. When the feature vector is a phase spectrum, the bin number of each feature vector is associated to the phase. When the feature vector is an autocorrelation coefficient sequence, the bin number of each feature vector is associated to a time difference (delay amount).

The feature is defined as a matrix in which a plurality of feature vectors is arranged. The feature includes feature vectors at times of a set of times (t1, t2, ..., t_N) (N is a positive integer). The feature is a spectrogram obtained by STFT, for example. Here, none of the times t1, t2, ..., and t_N have the same value, and are normally defined as $t2=t1+\Delta t$, $t3=t2+\Delta t$, ..., $t\_N=t\_(N-1)+\Delta t$ with $\Delta t>0$. That is, the sets of times (t1, t2, ..., t_N) are defined in ascending order and at equal intervals.

However, there can be a case where feature vectors at a plurality of times in the set of times (t1, t2, ..., t_N) have the same value. The information amount of the feature in this case becomes the same as the information amount of the feature excluding overlapping feature vectors. For example, in a case where the feature vectors at the times t1 and t2 have the same value, the information amount of the feature including the feature vector at each time of the set of times (t1, t2, ..., t_N) is the same as the information amount of the feature including the feature vector at each time of a set of times (t1, t3, ..., t_N). Therefore, in such a case, the set of times (t1, t2, ..., t_N) may be treated similarly to the set of times (t1, t3, t4, ..., t_N). That is, instead of calculating the feature including the feature vector at each time of the set of times (t1, t2, ..., t_N), the feature including the feature vector at each time of the set of times (t1, t3, ..., t_N) may be calculated.

Also when the set of times (t1, t2, ..., t_N) is not arranged in ascending order, the information amount of the feature does not change. Therefore, in this case, the set of times (t1, t2, ..., t_N) is treated similarly to the case of a set of times (T1, T2, ..., T_N) sorted in ascending order. Also the case where the set of times (t1, t2, ..., t_N) is not at equal intervals is also treated similarly to the case where the set of times (t1, t2, ..., t_N) is at equal intervals.

Alternatively, it is possible to directly generate a feature corresponding to the set of times (t1, t2, ..., t_N) from the sound signal without generating a feature vector. In this case, it is possible to generate the feature from the sound signal by using a transform that changes depending on time, e.g., a wavelet transform. Hereinafter, a feature generated from a sound signal without generating a feature vector and a feature generated via a feature vector are not distinguished.

The concatenated feature is one feature generated by concatenating a plurality of features of a sound signal. Concatenate is to bring together a plurality of something (here, a plurality of features). Specifically, the concatenating unit 20 generates a concatenated feature including a plurality of features as a plurality of channels. In other words, the concatenating unit 20 generates a concatenated feature by concatenating the plurality of features in the channel direction.

The concatenating unit 20 transmits information indicating the generated concatenated feature to the learning unit 30. A specific example of a concatenated feature including a plurality of features as a plurality of channels will be described in the second example embodiment.

The learning unit 30 learns the generated concatenated feature and, thereby, generates a sound model for distinguishing a sound event from a sound signal. In other words, the learning unit 30 trains the sound model in such a way as to distinguish the sound event from the sound signal using the concatenated feature. The learning unit 30 is an example of a learning means. Specifically, the learning unit 30 receives information indicating the concatenated feature from the concatenating unit 20. The learning unit 30 generates a learned sound model by performing machine learning (e.g., deep learning) for the sound model using the concatenated feature.

The sound model is an inference program used for distinguishing the sound event from the sound signal. For example, the sound model is a neural network that receives data of the concatenated feature of the sound signal and outputs a distinction result of the sound event. In particular, the sound model may be a convolutional neural network (CNN).

The learning unit 30 may store the learned sound model into a sound model storage device (database) not illustrated. Alternatively, the learning unit 30 may output the learned sound model to a sound event distinction device (device that distinguishes a sound event) not illustrated. The sound event distinction device will be described in the second example embodiment described later.

(Operation of Sound Model Generation Device 1)

The operation of the sound model generation device 1 according to the present first example embodiment will be described with reference to FIG. 2. FIG. 2 is a flowchart illustrating the flow of operation of the sound model generation device 1.

Figure 2:
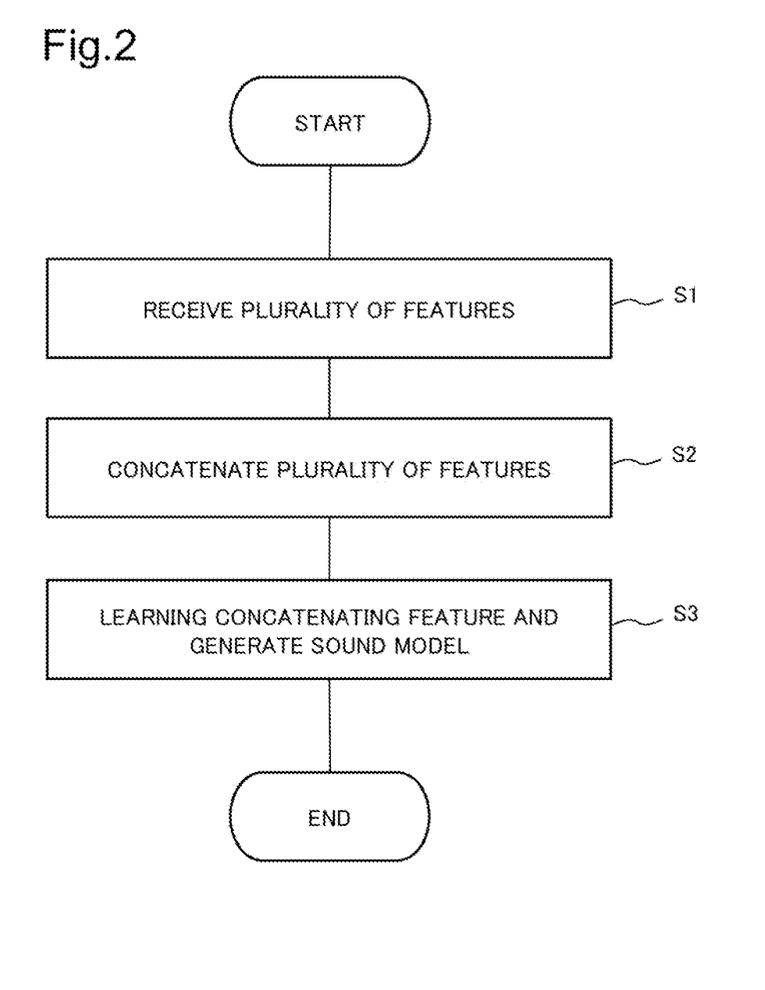
FIG. 2 is a flowchart illustrating a flow of operation of the sound model generation device according to the first example embodiment.

As illustrated in FIG. 2, the concatenating unit 20 receives information indicating a plurality of features (S1).

The concatenating unit 20 concatenates the plurality of features having been received (S2). Thus, the concatenating unit 20 generates a concatenated feature in which the plurality of features is concatenated.

The concatenating unit 20 transmits information indicating the generated concatenated feature to the learning unit 30.

The learning unit 30 receives information indicating the concatenated feature from the concatenating unit 20. The learning unit 30 learns the concatenated feature and, thereby, generates the sound model for the concatenated feature (S3).

The learning unit 30 may store the generated sound model into a database not illustrated. Alternatively, the learning unit 30 may output the learned sound model to a sound event distinction device (device that distinguishes a sound event) not illustrated.

Thus, the operation of the sound model generation device 1 ends.

Effects of Present Example Embodiment

According to the configuration of the present example embodiment, the concatenating unit 20 generates a concatenated feature by concatenating a plurality of features of the sound signal that is training data. The learning unit 30 learns the generated concatenated feature and, thereby, generates a sound model for distinguishing a sound event from a sound signal. Thus, a learned sound model is generated. When the data of the concatenated feature is input, the learned sound model outputs a distinction result of the sound event. Therefore, it is possible to more easily generate a sound model capable of distinguishing a sound event by using a plurality of features.

Second Example Embodiment

The second example embodiment will be described with reference to FIGS. 3 to 8. In the present example embodiment, a sound signal processing system including a sound model generation device, a sound model storage device, and a sound event distinction device will be described.
(Sound Signal Processing System 1000)

Figure 3:
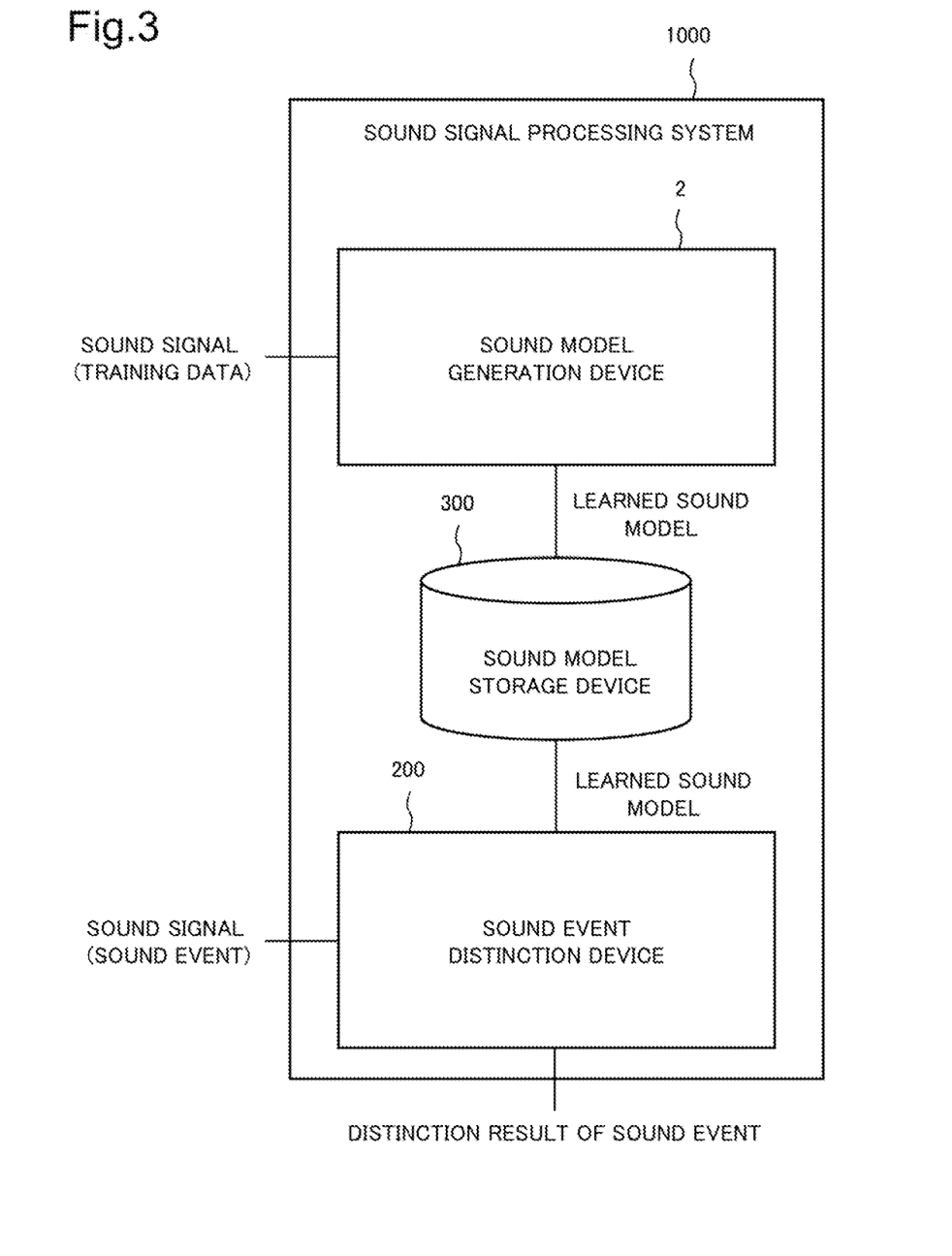
FIG. 3 is a block diagram illustrating a configuration of a sound signal processing system according to a second example embodiment.

The configuration of a sound signal processing system 1000 according to the present second example embodiment will be described with reference to FIG. 3. FIG. 3 is a block diagram illustrating the configuration of the sound signal processing system 1000.

As illustrated in FIG. 3, the sound signal processing system 1000 includes a sound model generation device 2, a sound event distinction device 200, and a sound model storage device 300.

The sound model generation device 2 acquires a sound signal that is training data. The sound signal is a signal indicating voice or audio. The sound signal mentioned here may be a voice signal indicating voice of a person or an audio signal indicating an operation sound of a machine.

The sound model generation device 2 learns the acquired sound signal and, thereby, generates the sound model for the acquired sound signal. The sound model is an inference program used for distinguishing the sound event from the sound signal.

For example, the sound model is a neural network, and weights in this neural network are determined by learning. The sound model generation device 2 stores information indicating the learned sound model into the sound model storage device 300.

The sound model generation device 2 learns each sound event and, thereby, generates the sound model for each sound event. The sound model generation device 2 stores information indicating the sound event and information indicating the learned sound model in association with each other into the sound model storage device 300.

For example, the sound event is occurrence of an abnormality of a machine and an abnormal sound associated with it, or destruction of a machine and a sudden sound (impulse sound) associated with it. A detailed configuration (constituent element) of the sound model generation device 2 will be described later.

The sound model storage device 300 stores a sound model for each sound event generated by the sound model generation device 2. The sound model storage device 300 may be connected to the sound model generation device 2 and the sound event distinction device 200 via a network. Alternatively, the sound model storage device 300 may be an external resource on the Internet.

The sound event distinction device 200 receives information regarding a sound event that is a target of distinction. The sound event distinction device 200 receives a sound signal collected using a microphone, for example.

The sound event distinction device 200 acquires a learned sound model with reference to the sound model storage device 300. The sound event distinction device 200 distinguishes the sound event from the sound signal based on the learned sound model. The sound event distinction device 200 outputs a distinction result of the sound event. A specific example of the method in which the sound event distinction device 200 distinguishes the sound event will be described later.

The sound event distinction device 200 may display a distinction result of the sound event on a display not illustrated. Alternatively, the sound event distinction device 200 may output an alert associated to the distinction result of the sound event.

For example, in a case where the sound event is due to an abnormality of a machine, the sound event distinction device 200 turns on a rotating light (emergency light). Other than that, the sound event distinction device 200 may output a warning sound from a speaker not illustrated. A detailed configuration (constituent element) of the sound event distinction device 200 will be described later.
(Sound Model Generation Device 2)

Figure 4:
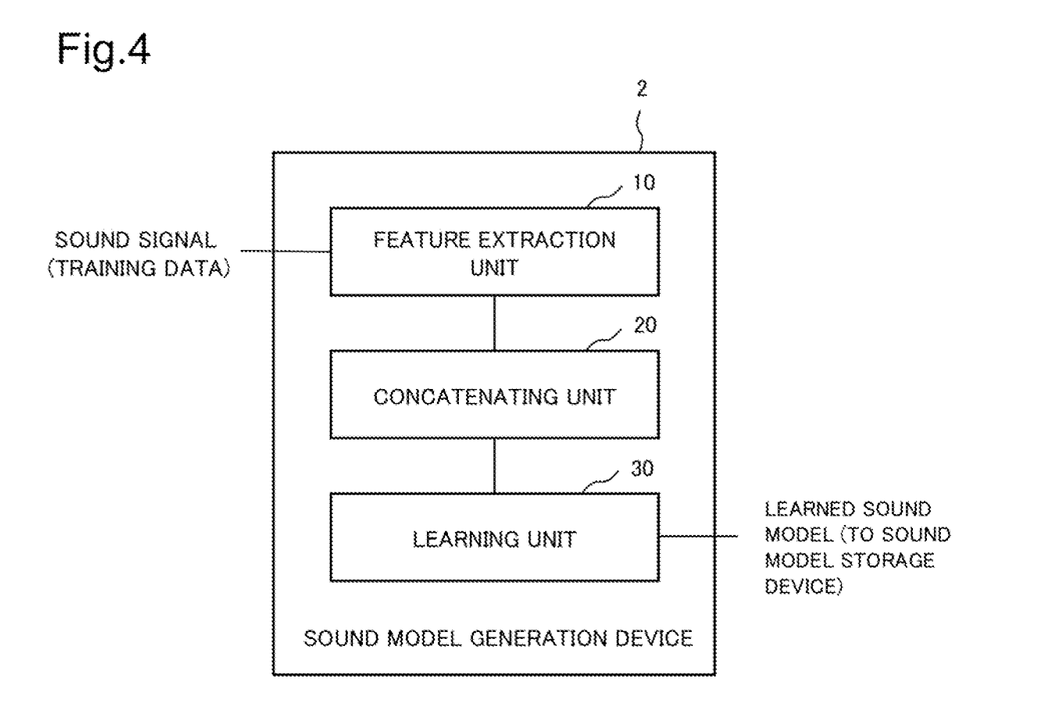
FIG. 4 is a block diagram illustrating a configuration of a sound model generation device according to the second example embodiment.

The configuration of the sound model generation device 2 according to the present second example embodiment will be described with reference to FIG. 4. FIG. 4 is a block diagram illustrating the configuration of the sound model generation device 2.

As illustrated in FIG. 4, the sound model generation device 2 includes a feature extraction unit 10, the concatenating unit 20, and the learning unit 30.

The feature extraction unit 10 extracts a plurality of features from a sound signal that is training data. The feature extraction unit 10 is an example of a feature extraction means.

Specifically, the feature extraction unit 10 acquires a sound signal as training data. The sound signal that is the training data may be a stationary signal having periodicity, such as a motor sound, or may be a sudden signal that has an abrupt temporal change, such as an abnormal sound of a machine. For example, the sound signal is a voice signal indicating voice of a person. Alternatively, the sound signal may be an audio signal indicating an operation sound of a machine. Hereinafter, these voice signals or audio signals collected by a microphone, quantized, and stored in a database will be described as sound signals.

The feature extraction unit 10 extracts a plurality of features from the acquired sound signal. The feature of the sound signal is information indicating a property of the sound signal. In the present second example embodiment, the feature extraction unit 10 obtains a plurality of features by executing various conversions on the sound signal of training data. For example, the feature extraction unit 10 performs short time Fourier transform (STFT), wavelet transform, and constant quality factor transform (CQT) on the sound signal of training data. Thus, a plurality of features is obtained.

The feature extraction unit 10 may perform noise cancellation, filtering, or other preprocessing on the sound signal before executing various conversions.

The feature extraction unit 10 extracts a plurality of features from the sound signal at predetermined times t1, t2, . . . , and t_N, and transmits information indicating the plurality of extracted features to the concatenating unit 20.

The concatenating unit 20 generates a concatenated feature by concatenating a plurality of features. The concatenating unit 20 is an example of a concatenating means.

Specifically, the concatenating unit 20 receives information indicating a plurality of features from the feature extraction unit 10. The concatenating unit 20 generates one concatenated feature by concatenating the plurality of received features. The generated concatenated feature includes a plurality of concatenated features.

As described above, the concatenated feature according to the present second example embodiment includes a plurality of features as a plurality of channels. The channel mentioned here is associated to a dimension in a direction representing a color expression (RGB or YMCK) in an image. The concatenating unit 20 transmits information indicating the generated concatenated feature to the learning unit 30. An example of the concatenated feature will be described later.

The learning unit 30 learns the generated concatenated feature and, thereby, generates a sound model for distinguishing a sound event. In other words, the learning unit 30 trains the sound model in such a way as to distinguish the sound event using the concatenated feature. The learning unit 30 is an example of a learning means.

Specifically, the learning unit 30 receives information indicating the concatenated feature from the concatenating unit 20. The learning unit 30 generates a learned sound model by performing machine learning (e.g., deep learning) using the concatenated feature. The sound model is an inference program used for distinguishing the sound event from the sound signal.

In the present second example embodiment, the learning unit 30 learns a multichannel concatenated feature as training data, and, thereby the sound model for the multichannel concatenated feature. The learned sound model distinguishes a sound event by using the concatenated feature generated from a sound signal by the method described in the first example embodiment. The learning unit 30 stores the program data and the parameter data of the learned sound model into the sound model storage device 300 illustrated in FIG. 3.

(Sound Event Distinction Device 200)

Figure 5:
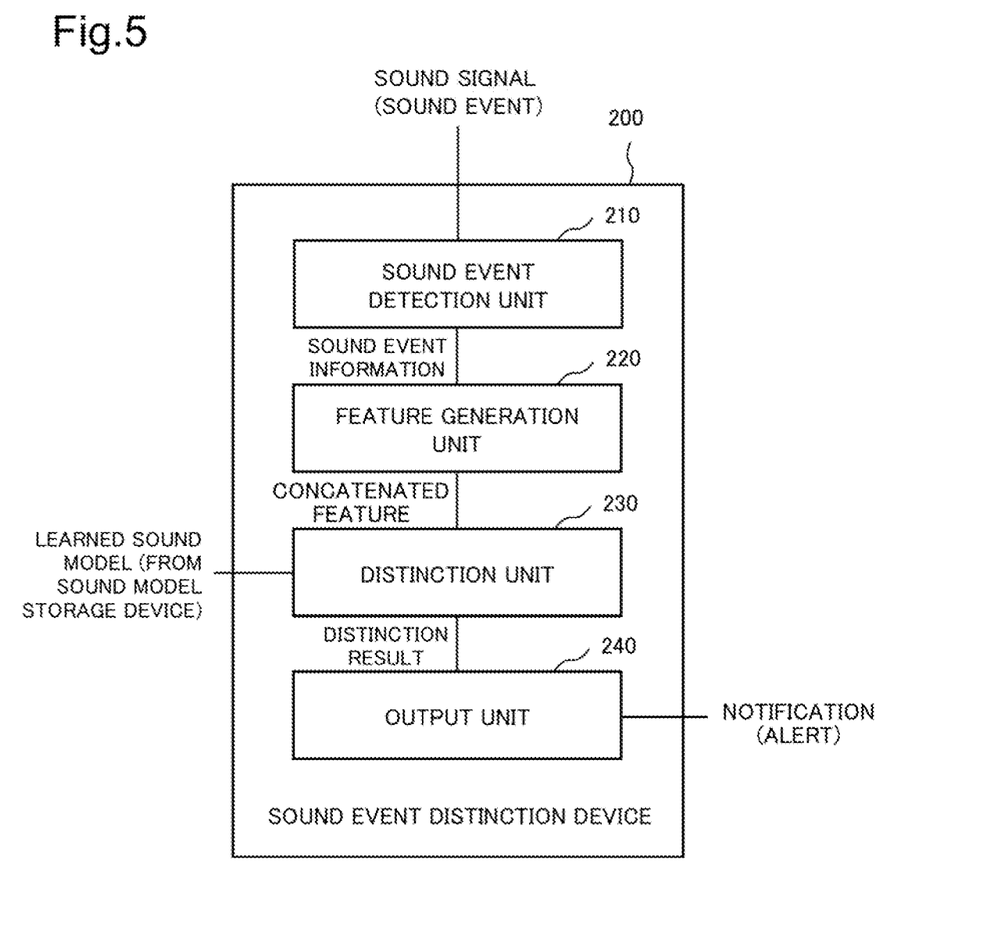
FIG. 5 is a block diagram illustrating a configuration of a sound event distinction device according to the second example embodiment.

The configuration of the sound event distinction device 200 according to the present second example embodiment will be described with reference to FIG. 5. FIG. 5 is a block diagram illustrating the configuration of the sound event distinction device 200. As illustrated in FIG. 5, the sound event distinction device 200 includes a sound event detection unit 210, a feature generation unit 220, a distinction unit 230, and an output unit 240.

The sound event detection unit 210 detects a sound event. Specifically, the sound event detection unit 210 detects a sound signal based on a sound event using a sound sensor (e.g., a microphone). The sound event detection unit 210 transmits the detected sound signal (hereinafter, referred to as sound event information) to the feature generation unit 220.

The feature generation unit 220 receives the sound event information (i.e., sound signal) from the sound event detection unit 210. The feature generation unit 220 extracts a plurality of features from the sound signal detected by the sound event detection unit 210, and generates a concatenated feature by concatenating the plurality of features having been further extracted.

The method used by the feature generation unit 220 to extract a feature from a sound signal is the same as the method used by the feature extraction unit 10 of the sound model generation device 2 to extract a plurality of features. For example, the feature generation unit 220 generates a spectrogram from a sound signal by STFT analysis.

The feature generation unit 220 transmits information indicating the thus generated concatenated feature to the distinction unit 230.

The distinction unit 230 receives information indicating the concatenated feature from the feature generation unit 220. The distinction unit 230 distinguishes a sound event by using the learned sound model stored in the sound model storage device 300. More specifically, the distinction unit 230 inputs the concatenated feature to the learned sound model, and receives the distinction result of the sound event output from the learned sound model.

The distinction unit 230 transmits the distinction result of the sound event to the output unit 240. For example, the distinction unit 230 outputs information indicating whether the distinguished sound event is associated to a predetermined sound event. Alternatively, if the distinguished sound event is associated to the predetermined sound event, the distinction unit 230 may transmit, to the output unit 240, a trigger signal for causing the output unit 240 to output an alert.

The output unit 240 receives the distinction result of the sound event from the distinction unit 230. The output unit 240 performs notification according to the distinction result of the sound event. Specifically, if the sound event distinguished by the distinction unit 230 is associated to the predetermined sound event, the output unit 240 outputs an alert. For example, the output unit 240 outputs an alert using a rotating light or a speaker.

As described above, the learned sound model can distinguish the sound event by using the concatenated feature. When the sound event distinction device 200 inputs, to the learned sound model, the concatenated feature generated from the sound signal, the distinction result of the sound event is output from the learned sound model. Therefore, the sound event distinction device 200 can obtain the distinction result of the sound event by inputting, to the learned sound model, the concatenated feature generated from the sound signal.

(Example of Concatenated Feature)

Figure 6:
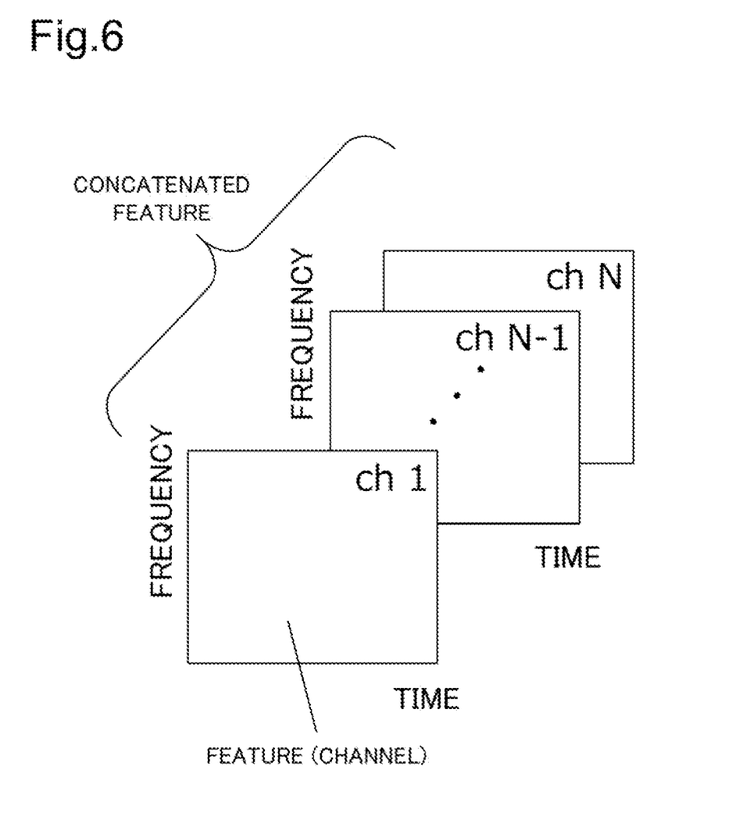
FIG. 6 is a schematic view of a concatenated feature in which a plurality of features is concatenated.

FIG. 6 schematically illustrates an example of a concatenated feature in which a plurality of features is concatenated. As illustrated in FIG. 6, the concatenated feature is generated by concatenating a plurality of features in the channel direction. The concatenated feature illustrated in FIG. 6 includes N (≥2) channels. Each feature corresponds to one channel of the concatenated feature.

(Operation of Sound Model Generation Device 2)

Figure 7:
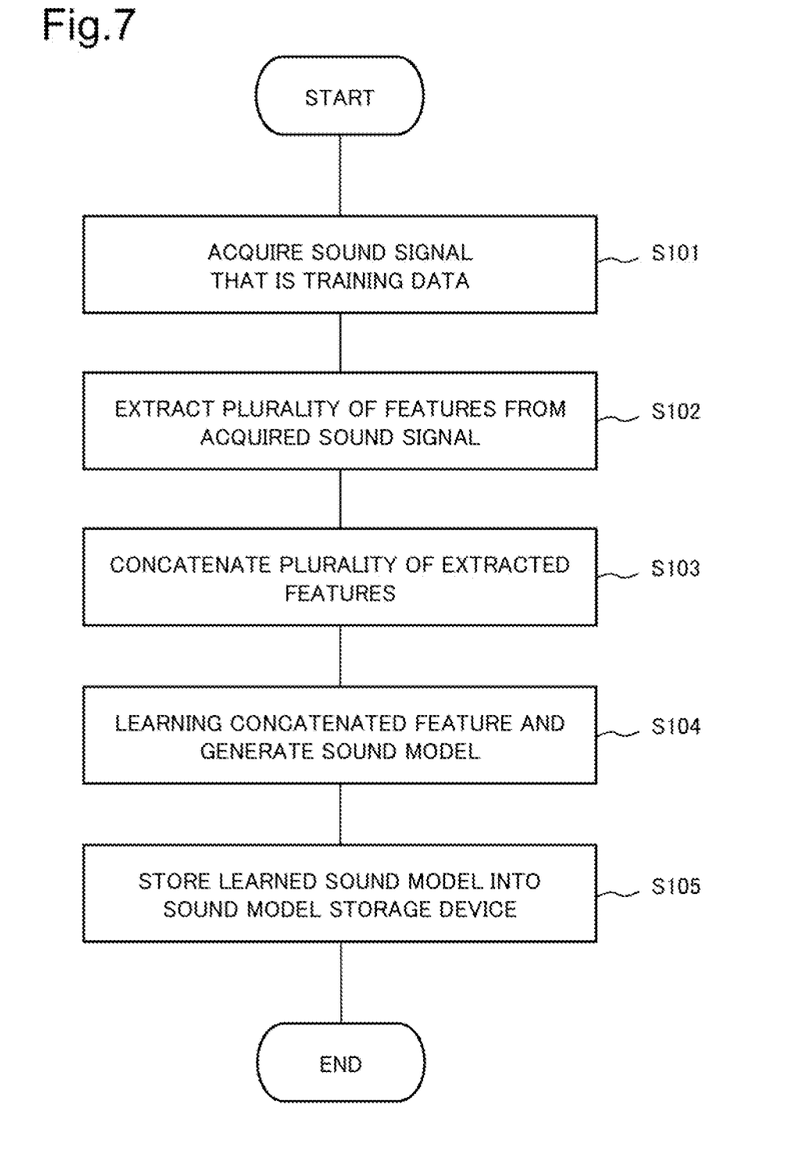
FIG. 7 is a flowchart illustrating a flow of operation of the sound model generation device according to the second example embodiment.

The operation of the sound model generation device 2 according to the present second example embodiment will be described with reference to FIG. 7. FIG. 7 is a flowchart illustrating the flow of operation of the sound model generation device 2.

As illustrated in FIG. 7, the feature extraction unit 10 acquires a sound signal as training data (S101).

The feature extraction unit 10 extracts a plurality of features from the acquired sound signal (S102). The feature extraction unit 10 transmits information indicating the plurality of extracted features to the concatenating unit 20.

The concatenating unit 20 receives information indicating a plurality of features from the feature extraction unit 10. The concatenating unit 20 concatenates the plurality of features having been received (S103). In this way, the concatenating unit 20 generates a concatenated feature in which the plurality of features is concatenated. The concatenating unit 20 transmits information indicating the generated concatenated feature to the learning unit 30.

The learning unit 30 receives information indicating the concatenated feature from the concatenating unit 20. The learning unit 30 learns the concatenated feature and, thereby, generates the sound model for the concatenated feature (S104).

The learning unit 30 stores the program data and the parameter data of the learned sound model into the sound model storage device 300 (S105).

Thus, the operation of the sound model generation device 2 ends.

(Operation of Sound Event Distinction Device 200)

Figure 8:
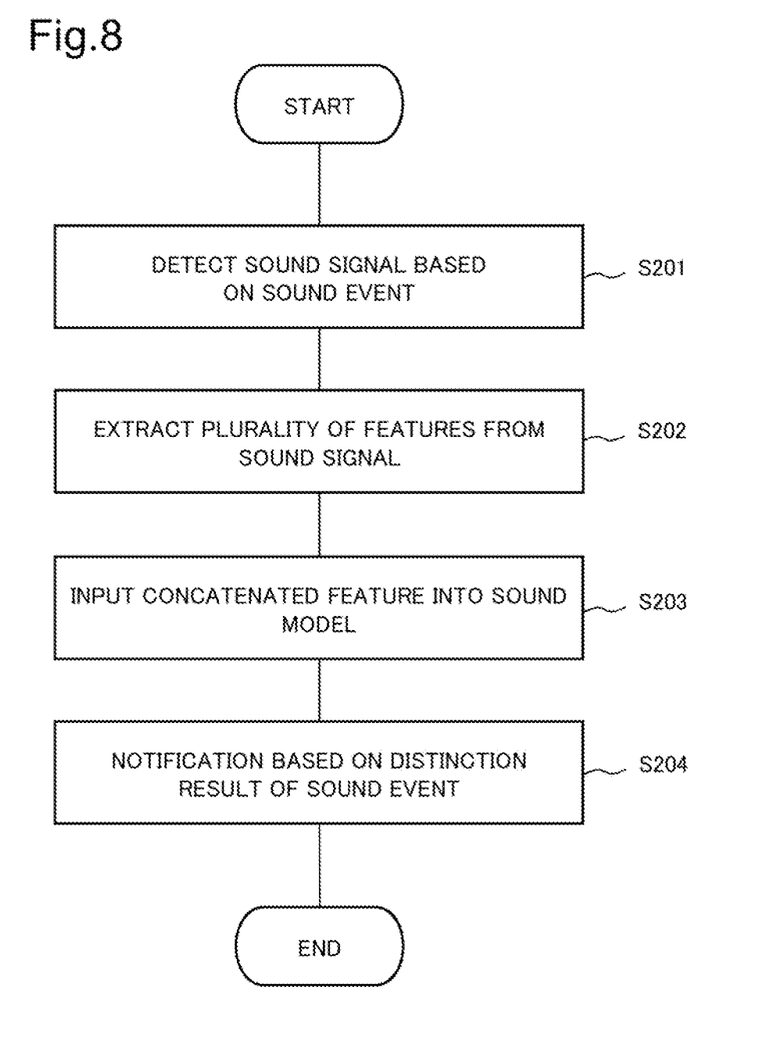
FIG. 8 is a flowchart illustrating a flow of operation of the sound event distinction device according to the second example embodiment.

The operation of the sound event distinction device 200 according to the present second example embodiment will be described with reference to FIG. 8. FIG. 8 is a flowchart illustrating the flow of operation of the sound event distinction device 200.

As illustrated in FIG. 8, the sound event detection unit 210 detects a sound signal as a sound event using a sound sensor (e.g., a microphone) (S201). The sound event detection unit 210 transmits sound event information including the detected sound signal to the feature generation unit 220.

The feature generation unit 220 receives the sound event information from the sound event detection unit 210. The feature generation unit 220 extracts a plurality of features from the sound signal detected by the sound event detection unit 210 (S202). The feature generation unit 220 transmits information indicating the plurality of extracted features to the distinction unit 230.

The distinction unit 230 receives information indicating a plurality of features from the feature generation unit 220. The distinction unit 230, the distinction unit 230 inputs, into the learned sound model stored in the sound model storage device 300, the concatenated feature in which the plurality of received features are concatenated (S203). The distinction unit 230 receives the distinction result of the sound event output from the learned sound model. The distinction unit 230 transmits the distinction result of the sound event to the output unit 240.

The output unit 240 receives the distinction result of the sound event from the distinction unit 230. The output unit 240 performs notification according to the distinction result of the sound event (S204). The specific example of the notification is as described above.

Thus, the operation of the sound event distinction device 200 ends.

Effects of Present Example Embodiment

According to the configuration of the present example embodiment, the feature extraction unit 10 extracts a plurality of features from a sound signal that is training data. The concatenating unit 20 generates a concatenated feature by concatenating a plurality of features. The learning unit 30 learns the generated concatenated feature and, thereby, generates a sound model for distinguishing a sound event. The thus generated learned sound model can determine a sound event by using the plurality of features included in the concatenated feature. Therefore, it is possible to more easily generate a sound model capable of distinguishing a sound event by using a plurality of features.

Third Example Embodiment

The third example embodiment will be described below with reference to FIG. 9.

(Regarding Hardware Configuration)

The constituent elements of the sound model generation devices 1 and 2 described in the first and second example embodiments indicate blocks of functional units. Some or all of these constituent elements are enabled by an information processing device 900 as illustrated in FIG. 9, for example. FIG. 9 is a block diagram illustrating an example of the hardware configuration of the information processing device 900.

Figure 9:
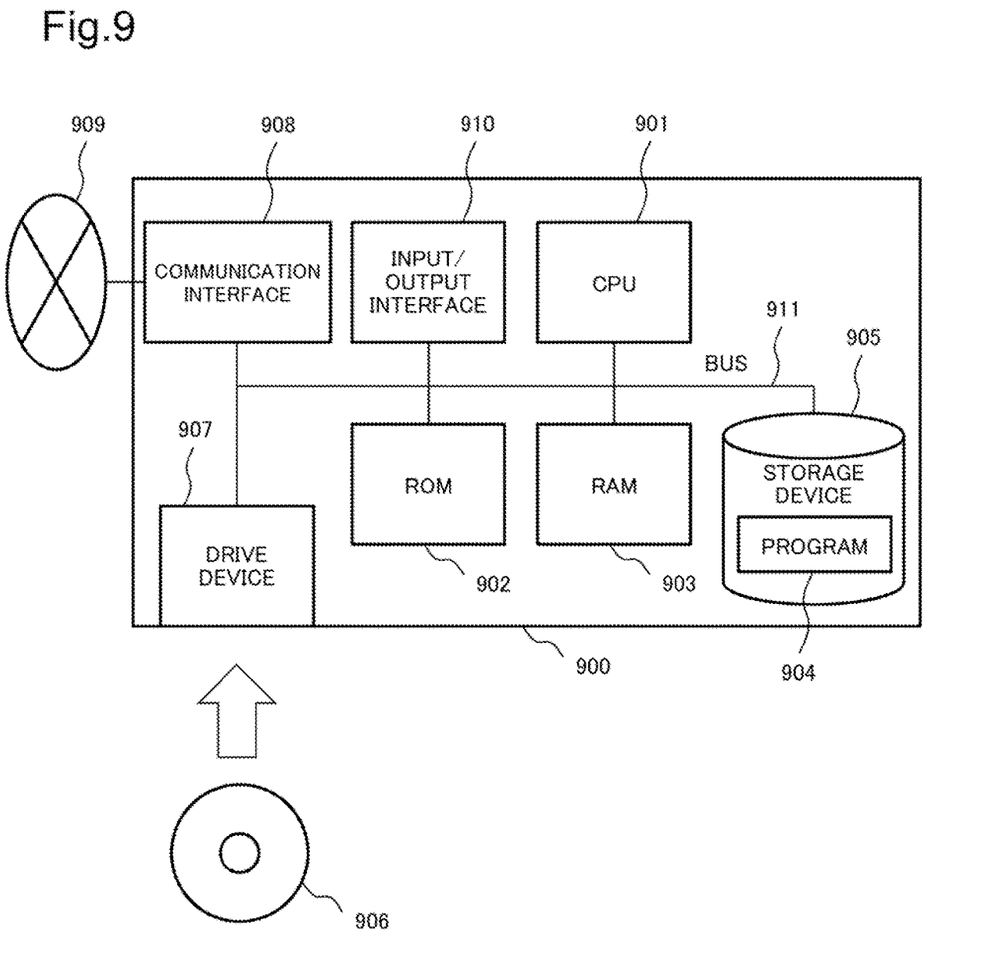
FIG. 9 is a view illustrating a hardware configuration of an information processing device according to a third example embodiment.

As illustrated in FIG. 9, the information processing device 900 includes the following configuration as an example.

Central processing unit (CPU) 901
Read only memory (ROM) 902
Random access memory (RAM) 903
Program 904 to be loaded into the RAM 903
Storage device 905 storing the program 904
Drive device 907 reading and writing a recording medium 906
Communication interface 908 connected to a communication network 909
Input/output interface 910 performing input/output of data
Bus 911 connecting constituent elements The constituent elements of the sound model generation devices 1 and 2 described in the first and second example embodiments are enabled by the CPU 901 reading and executing the program 904 that enables these functions. The program 904 that enables the functions of the constituent elements is stored in the storage device 905 or the ROM 902 in advance, for example, and the CPU 901 loads the program 904 into the RAM 903 and executes the program as necessary. The program 904 may be supplied to the CPU 901 via the communication network 909, or may be stored in the recording medium 906 in advance, read by the drive device 907, and supplied to the CPU 901.

Effects of Present Example Embodiment

According to the configuration of the present example embodiment, the sound model generation device described in the above present example embodiments is enabled as hardware. Therefore, effects similar to the effects described in the above example embodiments can be achieved.

A part or the entirety of the above example embodiments can be described as the following supplementary notes, but are not limited to the following.

(Supplementary Note 1)

A sound model generation device including:

a concatenating means for generating a concatenated feature by concatenating a plurality of features of a sound signal that is training data; and a learning means for learning the concatenated feature for generating a sound model for distinguishing a sound event from the sound signal.

(Supplementary Note 2)

The sound model generation device according to supplementary note 1, wherein the concatenating means generates, as the concatenated feature, a multichannel feature including the plurality of features as a plurality of channels.

(Supplementary Note 3)

The sound model generation device according to supplementary note 1 or 2, wherein the learning means learns the concatenated feature by performing deep learning for generating the sound model.

(Supplementary Note 4)

The sound model generation device according to any one of supplementary notes 1 to 3 further including:

a feature extraction means for extracting the plurality of features from the sound signal that is training data.

(Supplementary Note 5)

The sound model generation device according to supplementary note 4, wherein the feature extraction means configured to extract the plurality of features by performing specific conversion on the sound signal.

(Supplementary Note 6)

The sound model generation device according to supplementary note 5, wherein the feature extraction means executes short time Fourier transform (STFT), wavelet transform, or constant quality factor transform (CQT) on the sound signal.

(Supplementary Note 7)

The sound model generation device according to any one of supplementary notes 1 to 6, wherein the plurality of features includes at least any of a mean amplitude, power, a power spectrum, a logarithmic spectrum, a mel spectrum, a CQT spectrum, a line spectral pair (LSP) spectrum, a phase spectrum, an autocorrelation coefficient sequence, a mel-frequency cepstrum coefficients (MFCC) coefficient sequence, and a group delay coefficient sequence.

(Supplementary Note 8)

A sound signal processing system including:

the sound model generation device according to any one of supplementary notes 1 to 7;

a sound model storage device that stores the sound model having been learned; and a sound event distinction device that distinguishes the sound event using the sound model stored in the sound model storage device.

(Supplementary Note 9)

A sound event distinction device including:

a sound event detection means configured to detect a sound event;

a distinction means configured to distinguish the sound event by using the sound model generated by the sound model generation device according to any one of supplementary notes 1 to 8; and an output means configured to output a distinction result of the sound event.

(Supplementary Note 10)

A sound model generation method including:

generating a concatenated feature by concatenating a plurality of features of a sound signal that is training data; and learning the concatenated feature for generating a sound model for distinguishing a sound event from the sound signal.

(Supplementary Note 11)

A non-transitory recording medium that stores a program for causing a computer to execute:

generating a concatenated feature by concatenating a plurality of features of a sound signal that is training data; and learning the concatenated feature for generating a sound model for distinguishing a sound event from the sound signal.

The present invention has been described above using the above-described example embodiments as exemplary examples. However, the present invention is not limited to the above-described example embodiments. That is, it will be understood by those of ordinary skill in the art that various aspects in the above-described example embodiments may be applied thereto without departing from the spirit and scope of the present invention as defined by the claims.

INDUSTRIAL APPLICABILITY

The present invention can be used, for example, indoors or in town, to monitor the behavior of people and to monitor whether a machine is operating normally. The present invention can also be used to evaluate the transient property of earphones or hearing aids.

REFERENCE SIGNS LIST 1 sound model generation device
2 sound model generation device
10 feature extraction unit
20 concatenating unit
30 learning unit
200 sound event distinction device
300 sound model storage device
1000 sound signal processing system

What is claimed is:

1. A sound model generation device comprising:
at least one memory storing instructions; and
at least one processor configured to access the at least one memory and execute the instructions to:
generate a concatenated feature by linking a plurality of features of a sound signal in a channel direction, wherein the concatenated feature is a multichannel feature including the plurality of features of the sound signal as a plurality of channels, and the plurality of features of the sound signal are training data;
learns the concatenated feature; and
generate a sound model for distinguishing a sound event from the sound signal.

2. The sound model generation device according to claim 1, wherein
the multichannel feature is a set based on a feature type of.

3. The sound model generation device according to claim 1, wherein the at least one processor is further configured to execute the instructions to:

learn the concatenated feature by deep learning for generating the sound model.

4. The sound model generation device according to claim 1, wherein the at least one processor is further configured to execute the instructions to:

extract the plurality of features from the sound signal.

5. The sound model generation device according to claim 4, wherein the at least one processor is further configured to execute the instructions to:

extract the plurality of features by performing a specific conversion on the sound signal.

6. The sound model generation device according to claim 5, wherein the at least one processor is further configured to execute the instructions to:

execute a short time Fourier transform (STFT), a wavelet transform, or a constant quality factor transform (CQT) on the sound signal.

7. The sound model generation device according to claim 1, wherein the plurality of features includes at least any of a mean amplitude, power, a power spectrum, a logarithmic spectrum, a mel spectrum, a CQT spectrum, a line spectral pair (LSP) spectrum, a phase spectrum, an autocorrelation coefficient sequence, a mel-frequency cepstrum coefficients (MFCC) coefficient sequence, and a group delay coefficient sequence.

8. A sound model generation method performed by a computer and comprising:

generating a concatenated feature by linking a plurality of features of a sound signal in a channel direction, wherein the concatenated feature is a multichannel feature including the plurality of features of the sound signal as a plurality of channels, and the plurality of features of the sound signal are training data;

learning the concatenated feature; and generating a sound model for distinguishing a sound event from the sound signal.

9. A non-transitory recording medium that stores a program for causing a computer to execute:

generating a concatenated feature by linking a plurality of features of a sound signal in a channel direction, wherein the concatenated feature is a multichannel feature including the plurality of features of the sound signal as a plurality of channels, and the plurality of features of the sound signal are training data;

learning the concatenated feature; and generating a sound model for distinguishing a sound event from the sound signal.

* * * * *